Nov. 17, 1953     T. R. HARRISON     2,659,234
TEMPERATURE MEASURING APPARATUS
Filed Nov. 14, 1949
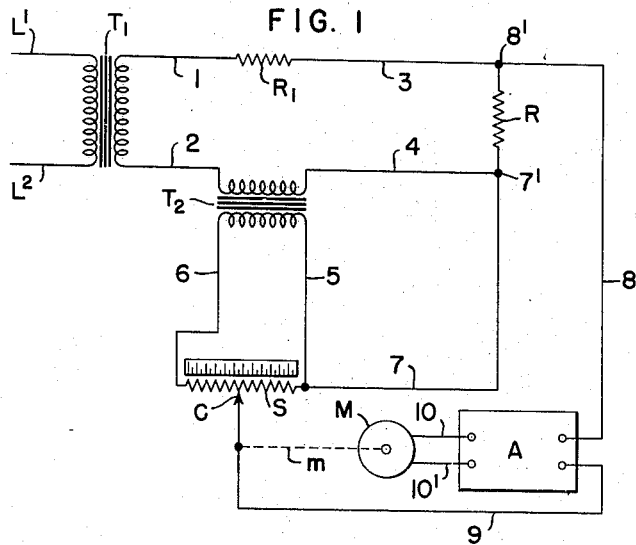
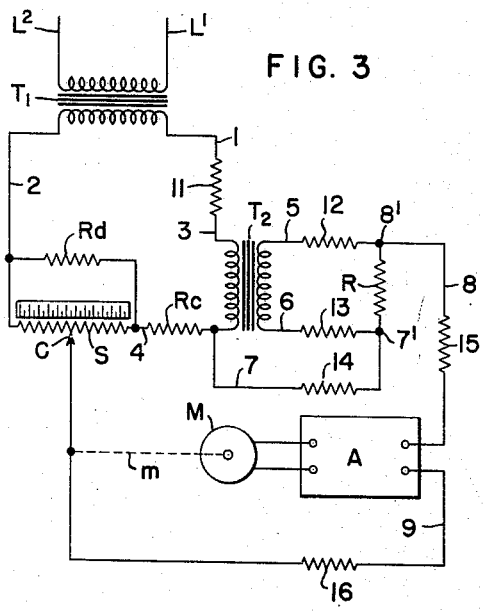
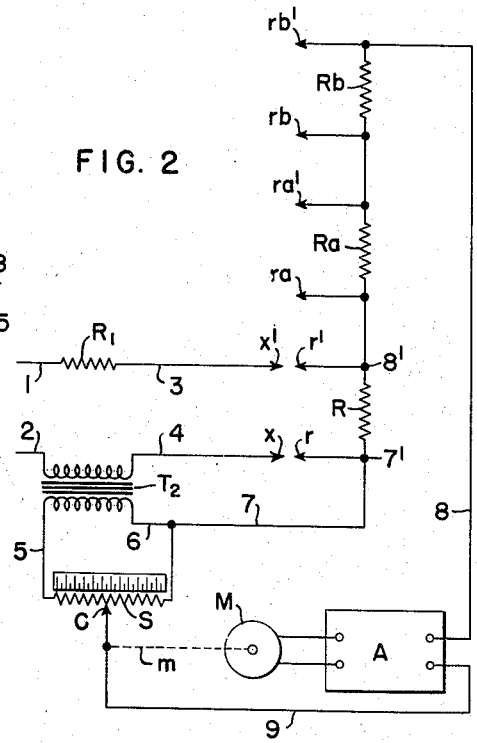
*INVENTOR.*
THOMAS R. HARRISON
BY *Arthur H. Swanson*
ATTORNEY.

Patented Nov. 17, 1953

2,659,234

UNITED STATES PATENT OFFICE 2,659,234

TEMPERATURE MEASURING APPARATUS

Thomas R. Harrison, Wyncote, Pa., assignor to Minneapolis-Honeywell Regulator Company, Minneapolis, Minn., a corporation of Delaware Application November 14, 1949, Serial No. 127,215

6 Claims. (Cl. 73—362)

1

The general object of the present invention is to provide improved resistance thermometer apparatus for measuring a variable temperature and for producing control effects in response to temperature variations. A primary object of the invention is to provide simple and effective means for passing an alternating current through a temperature responsive resistor to thereby produce a potential drop in said resistor dependent both on the magnitude of the current and on the potential drop in the resistor, and to provide simple and effective means for deriving an alternating current proportional to the first mentioned current from the latter, and for utilizing the second current to produce a potential drop in a comparison resistor which is proportional in magnitude to the current passing through the temperature responsive resistor, but is not dependent on the temperature of the latter.

The two potential drops thus created can be used in various ways, and in particular they can be used in comparing the potential drops in the two resistors, so as to derive a measure of the temperature to which the temperature responsive resistor is exposed, and/or to create a control force proportional to the difference between the two potential drops. That force can be used for various control purposes, as for example, to control the operation of a self-balancing measuring instrument measuring the temperature to which the temperature responsive resistor is exposed, or to regulate the temperature measured, or for both purposes.

A specific object of the invention is to provide simple and effective measuring circuit means for comparing the potential drop in a resistor responsive to temperature, produced by passing an alternating current through said resistor, with the potential drop produced in a second resistor, not responsive to temperature, by passing a second current, proportional in strength to the first current, through said second resistor and proportioning the two currents by passing one of the currents through the primary winding of a transformer, and using the secondary winding of the transformer to develop the second current. The use of a suitable transformer in this arrangement ensures that a predetermined proportion is maintained between the current flow through the temperature sensitive resistor and through the second resistor, which proportion is not affected by changes in the resistance of the lead wires or selector switch contacts which connect the said resistors to the other measuring circuit components.

2

The various features of novelty which characterize my invention are pointed out with particularity in the claims annexed to and forming a part of this specification. For a better understanding of the invention, however, its advantages, and specific objects attained with its use, reference should be had to the accompanying drawing and descriptive matter in which I have illustrated and described a preferred embodiment of the invention.

Of the drawings:

Fig. 1 is a circuit diagram illustrating one embodiment of the present invention;

Fig. 2 is a circuit diagram illustrating an adaptation of the Fig. 1 circuit arrangement for use in successively measuring the temperatures of the plurality of different temperature sensitive resistors; and Fig. 3 is a circuit diagram illustrating a modification of the circuit network shown in Fig. 1.

In the desirable embodiment of the invention illustrated diagrammatically in Fig. 1, R represents a resistance thermometer, or temperature sensitive resistor, connected in an alternating current energizing circuit for the maintenance of an alternating current flow through the resistor which varies in accordance with resistor temperature changes. As shown, said energizing circuit comprises the secondary winding of a transformer $T_1$ having its terminals 1 and 2 connected to the terminals 3 and 4, respectively, of the resistor R, the terminals 1 and 3 being connected through a resistor $R_1$, and the terminals 2 and 4 being connected by a primary winding of a transformer $T_2$. Conductors 5 and 6 connected to the secondary winding of the transformer $T_2$ are connected to the ends of a slide wire resistor S. The transformer $T_1$ has its primary winding connected to alternating current supply conductors $L'$ and $L^2$ which may be connected to any available source of alternating current of ordinary power line voltage and frequency, for example, 110–115 volts and 60 cycles per second. Ordinarily, the resistor $R_1$ is not an essential element of the energizing circuit for the resistor R, but in some cases, it may desirably minimize the effect of variations in the resistances of the various terminal conductors 1, 2, 3 and 4, by increasing the fixed resistance in said circuits.

The end 1' of the resistor R which is connected through the terminal conductor 4 to the primary winding of the transformer $T_2$, is also connected by the terminal conductor 7 to one end of the slide wire resistor S, and the second end 8' of the resistor R, which is connected to the terminal conductor 3, is also connected through a terminal conductor 8 and a conductor 9 to the slider contact C. The conductors 8 and 9 are connected to the input terminals of an amplifier A and thus form portions of an amplifier input circuit which in practice may well include the primary winding of a coupling transformer connected between the conductors 8 and 9.

The relative arrangement of the primary and secondary windings of the transformer $T_2$ and their respective connections to the resistor R and to the slide wire resistance S, are such that the current flowing in the primary winding toward or away from the resistor R through the conductor 4 is in phase with the current simultaneously flowing through the secondary winding respectively toward or away from the slide wire resistance S through the conductor 5.

The amplifier output terminals 10 and 10' are connected to and control the operation of a reversible motor M. The latter is diagrammatically shown as connected to the contact C by a mechanical adjusting connection $m$, through which the motor M adjusts the contact C along the resistance S on a change in the temperature of the resistor R. The adjustment of the contact S thus made on a change in the resistance of the resistor R, is in the direction and of the extent required to make the amplitude of the potential drop in the portion of the resistance S between the contact C and conductor 5 at any instant equal to the amplitude of the potential drop in the resistor R at the same instant.

The amplifier A and motor M form a rebalancing mechanism which may be of one or another well known type used as the rebalancing means of self-balancing measuring apparatus. For example, the amplifier A and motor M may form a rebalancing mechanism of the widely used type disclosed in the Wills Patent 2,423,540, of July 8, 1947. It is to be noted, however, that the current flowing in the input circuit of the amplifier disclosed in said patent is a unidirectional current, and prior to its amplification is converted into an alternating current signal, by a converter mechanism disclosed in said patent. No such converter mechanism is needed or included in the apparatus shown in Fig. 1, since in Fig. 1, the current flowing in the input circuit of the amplifier A is alternating current which varies in magnitude and phase with the extent and direction of the difference between the amplitude of the potential drop in the resistance S between the conductor 5 and the contact C, and the potential drop in the resistor R between its ends 7' and 8'.

While the transformer $T_2$ may act as a step-up or step-down transformer when conditions make such action desirable, a primary purpose of that transformer is to make the alternating current flowing toward or away from the slide wire S through the conductor 5 at any instant proportional in magnitude and similar in phase to the alternating current then flowing toward or away from the resistor R through the conductor 4, and point 7'. To this end, with the particular arrangement of the windings of the transformer $T_2$ and their conductors 2, 4, 5 and 6 illustrated in Fig. 1, the transformer windings are so connected that the direction of the currents flowing through the conductors 4 and 5 is as above described. However, if and when it should happen that the direction of the currents flowing through the conductors 4 and 5 is not correct, the proper arrangement can be readily obtained as, for example, by simply reversing the connections between the conductors 5 and 6 and the ends of the slide wire resistance S.

In the particular arrangement shown in Fig. 1, the conductors 7, 9 and 8 connect the portion of the resistance S between the contact C and conductor 5 in series with the resistor R, and the secondary winding of the transformer $T_2$ must be connected to the resistance S to pass current through the latter in the same direction, at any instant, as the current passing in series through the primary winding of the transformer $T_2$ and the resistor R.

The transformer $T_2$ may well be an iron core transformer with closely coupled primary and secondary circuits. With the current flowing through the resistor R operating in such a transformer to induce the current flowing through the slide wire resistance S, the position of the slider contact C required to make the potential drop in the resistor R equal to the potential drop in the portion of the slide wire resistance S at the right of the contact C as seen in Fig. 1, is almost wholly independent of fluctuations in the voltage between the supply conductors L' and $L^2$, and is but slightly affected by ordinary variations in the resistance of network circuit elements other than those produced by temperature changes in the resistor R.

The present invention is characterized not only by its comparative simplicity and low inherent cost of construction, but also by good sensitivity and the fact that the changes in position of the slider contact C along the slide wire resistance S are in linear proportion to the changes in the temperature of the resistor R. A scale and recording pen may be associated with the contact C or with some other element moved by the motor M in proportion to its rebalancing movements to indicate and record the varying temperature of the resistor R, in the manner in which the value of the quantity measured is indicated and recorded with the apparatus disclosed in said Wills patent. The invention is of especial value for use in measuring relatively high temperatures with wound type temperature responsive resistors since in such case the temperature responsive resistor R must be made of relatively thick wire to have a suitably long operative life and hence must be of relatively low resistance in comparison with the resistance of the leads or terminal conductors connected to the resistor R. A practically important advantage of the invention is its capacity for use in connection with a self-balancing potentiometric instrument of standard type, such as the well known commercial instrument made in accordance with the disclosure in the Wills patent.

The apparatus shown in Fig. 1 may be readily adapted for use in sequentially measuring the potential drops in a plurality of temperature sensitive resistors such as the resistors R, $Ra$ and $Rb$ shown in Fig. 2. Thus, as shown in Fig. 2, a plurality of temperature responsive resistors R, $Ra$ and $Rb$, are connected in series between the conductors 7 and 8, and are provided with individual pairs of terminals terminating in switch contacts $r$ and $r'$, $ra$ and $ra'$, $rb$ and $rb'$, respectively. In Fig. 2, the terminal conductors 3 and 4 are provided with switch contacts $x'$ and $x$ respectively, adapted to be bodily moved or otherwise brought into engagement with the corresponding contacts of one or another of different pairs of contacts $r$ and $r'$, $ra$ and $ra'$, and $rb$ and $rb'$. Thus, by suitable switch adjustments, the different temperature responsive resistors R, Ra and Rb may be operatively connected into the circuit network, one at a time in any desired or predetermined order.

When any one of the resistors R, Ra and Rb is operatively connected into the measuring circuit, the motor M proceeds automatically to adjust the slider contact C into the position in which it indicates the resistance of the resistor.

The present invention may take other forms than that shown in Fig. 1. Thus, for example, the resistor R may be connected in the secondary circuit of the transformer T2, and the slide wire S may be connected in the primary circuit of that transformer, as is shown in Fig. 3. However, in Fig. 3, as in Fig. 1, the currents flowing through the slide wire resistance S and the temperature responsive resistor R are maintained in definite proportion, since in Fig. 3, as in Fig. 1, one of those currents passes through the primary winding and induces the other current in the secondary winding of the associated transformer T2. As shown in Fig. 3, a resistor Rc is included in the conductor 4 which connects the slide wire S to one end of the primary winding of the transformer T2 and to the conductor 7 through which said primary winding of the transformer is connected to the end point 1' of the resistor R. In Fig. 3 also, a resistor Rd is connected in shunt to the slide wire resistor S. As those skilled in the art will recognize, the resistors Rc and Rd cooperate with the slide wire resistor S to determine the range of temperature which can be measured, and to provide a scale suppression effect, desirable in many cases.

While the resistors Rc and Rd each acts to reduce the current flow through the slide wire resistance S, they do not prevent the transformer T2 from maintaining the currents flowing through the resistor R and resistance S in suitable, predetermined, constant proportion. Resistances 11, 12, 13, 14, 15 and 16 are connected in various portions of the Fig. 3 network diagram to represent conductor resistances which may be included in the network when adapted for remote connection, and to make it apparent that resistance variations such as are normally encountered in practice in the resistance elements included in the Fig. 3 circuit, other than the temperature responsive resistor R, have no significant effect on the accuracy of the measurements made.

While, in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. Apparatus comprising in combination a temperature responsive resistor for exposure to a temperature to be measured, a comparison resistor, a transformer having a primary winding and a secondary winding, conductor means connecting one of said resistors and one of said transformer windings in an energizing circuit including terminal conductors for connecting said circuit to a source of alternating current, conductor means connecting the second of said resistors and the second of said windings in a circuit in which the current flow is proportional to the current flow in said energizing circuit, means connected in a circuit effectively including in series said temperature responsive resistor and at least a portion of said comparison resistor, the last mentioned means being operative to compare the potential drop in said temperature responsive resistor with the potential drop in said portion of said comparison resistor, and a utilization device cooperating with said last mentioned means and including a member positioned in accordance with the difference between said potential drops and hence in accordance with the resistance of said temperature responsive resistor.

2. Apparatus comprising in combination a temperature responsive resistor for exposure to a temperature to be measured, a comparison resistor, a transformer having a primary winding and a secondary winding, conductor means connecting one of said resistors and one of said transformer windings in an energizing circuit including terminal conductors for connecting said circuit to a source of alternating current, conductor means connecting the second of said resistors and the second of said windings in a circuit in which the current flow is proportional to the current flow in said energizing circuit, means connected in a circuit effectively including said temperature responsive resistor and at least a portion of said comparison resistor, the last mentioned means being operative to compare the potential drop in said temperature responsive resistor with the potential drop in said portion of said comparison resistor, and a utilization device cooperating with said last mentioned means and including a member positioned in accordance with the difference between said potential drops and hence in accordance with the resistance of said temperature responsive resistor.

3. Apparatus comprising in combination, a temperature responsive resistor for exposure to a temperature to be measured, a comparison resistor, a transformer having a primary winding and a secondary winding, conductor means connecting one of said resistors and one of said transformer windings in an energizing circuit including terminal conductors for connecting said circuit to a source of alternating current, conductor means connecting the second of said transformer windings to the second of said resistors, means connected in a circuit effectively including in series said temperature responsive resistor and at least a portion of said comparison resistor, the last mentioned means being operative to compare the potential drop in said temperature responsive resistor with the potential drop in said portion of said comparison resistor, and a utilization device cooperating with said last mentioned means and including a member positioned in accordance with the difference between said potential drops and hence in accordance with the resistance of said temperature responsive resistor.

4. Apparatus comprising in combination, a temperature responsive resistor for exposure to a temperature to be measured, a comparison resistor, a transformer having a primary winding and a secondary winding, conductor means connecting one of said resistors and one of said transformer windings in an energizing circuit including terminal conductors for connecting said circuit to a source of alternating current, conductor means connecting the second of said transformer windings to the second of said resistors, conductor elements effectively coupling said temperature responsive resistor and a portion, at least, of said comparison resistor in a comparison circuit in which the potential drop in said temperature responsive resistor is compared with the potential drop in the portion of the comparison resistor connected in said circuit, and means included in said comparison circuit responsive to the difference in said potential drops and producing a control effect dependent thereon.

5. Temperature measuring apparatus comprising a circuit network including a slide wire resistance, a temperature sensitive resistance for exposure to a temperature to be measured, a transformer having a primary winding and a secondary winding, conductor means connected to one of said resistances and one of said windings to form an energizing circuit including the last mentioned resistance and winding in series with one another and including conductors for connecting said winding to a source of alternating current thereby to maintain an alternating current flow in series through said resistance and winding, conductor means connecting the second of said resistances to the second of said windings to form a circuit including in series the last mentioned resistance and winding, whereby said transformer induces a current flow through said slide wire resistance varying in proportion with the variations in the current flow through the temperature sensitive resistance, and means providing a measure of the temperature of the temperature sensitive resistance comprising conductor means connecting one end of one resistance to one end of the other resistance, a slider contact in engagement with and adjustable along the length of the slide wire resistance, and conductor means connecting the second end of said temperature responsive resistance to said slider contact, whereby when said contact is adjusted into the position in which there is no current flow through the last mentioned conductor means, the position of said contact constitutes a measure of the temperature of the temperature responsive resistance.

6. Temperature measuring apparatus as specified in claim 5, including means responsive to the amplitude and phase of current flow through the conductor means connecting said slider contact to the second end of the temperature responsive resistance to adjust said slider contact into the position in which said current flow is eliminated.

THOMAS R. HARRISON.

References Cited in the file of this patent

UNITED STATES PATENTS

| Number | Name | Date |
| --- | --- | --- |
| 2,011,384 | Thal | Aug. 13, 1935 |
| 2,219,939 | Rich | Oct. 29, 1940 |
| 2,302,049 | Parker et al. | Nov. 17, 1942 |
| 2,366,694 | Bender | Jan. 9, 1945 |

FOREIGN PATENTS

| Number | Country | Date |
| --- | --- | --- |
| 322,357 | Germany | Jan. 28, 1919 |
| 614,952 | Great Britain | Dec. 30, 1948 |